3,303,218
TERT ARALKYLTHIOALKYL AMINO ALCOHOLS
Robert J. Wineman, Concord, John C. James, Melrose, and Morton H. Gollis, Brookline, Mass., assignors to Monsanto Research Corporation, St. Louis, Mo., a corporation of Delaware
No Drawing. Filed Feb. 28, 1962, Ser. No. 176,411
6 Claims. (Cl. 260—570.5)

This invention relates to new chemical compounds, and more particularly, provides novel N-alkyl-N-(aralkylthioalkyl)-aminoalkanols.

The N-(aralkylthioalkyl)aminoalkanols have a structure adapting them for use as intermediates in the synthesis of compounds having valuable properties as, for example, pharmaceuticals. However, such aminoalkanols may be unduly reactive for use in chemical synthesis: thus, conditions employed to convert the aralkylthio radical to desired other functional groups may instead or additionally cause undesired reactions, and particularly, cyclization. For example, the aminoalkanols which are secondary amines will form oxazolidones with carbonyl compounds; and those which are aminodialkanols will dehydrate to morpholine.

An object of this invention is to provide novel N-(aralkylthioalkyl)aminoalkanols resistant to cyclization.

A particular object of this invention is to provide novel N-alkyl-N-(aralkylthioalkyl)aminoalkanols adapted for use as chemical intermediates and for other purposes.

These and other objects will become evident from a consideration of the following specification and claims.

The amines of this invention are N-alkyl-N-(aralkylthioalkyl)aminoalkanols of the formula

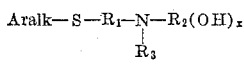

where each R is saturated aliphatic hydrocarbon, aralk is an aralkyl hydrocarbon radical consisting of saturated aliphatic hydrocarbon substituted by a benzenoid ring, and x is an integer of from 1 to 3, and each of the hydroxy groups is primary hydroxyl.

By each R is meant each of $R_1$, $R_2$ and $R_3$. By a benzenoid ring is meant phenyl or alkyl phenyl such as tolyl. In the tertiary amines of the invention, each hydrocarbon radical may contain up to 12 carbon atoms. The compounds in which each saturated aliphatic hydrocarbon radical is lower aliphatic, containing up to six carbon atoms, are preferred. For stability, at least two carbon atoms should intervene between an amine nitrogen atom and other hetero atoms (non-carbon atoms such as O and S), and the 2-thioalkyl and 3-thioalkyl compounds are preferred. An especially preferred group comprises the compounds in which the nitrogen atom is beta to each of a sulfur-substituted carbon atom and a hydroxy-substituted carbon atom. Aralkyl is preferably 1-arylalkyl, and most preferably benzyl.

The compounds contemplated and falling in the scope of the above formula include, for example 2-([2-benzylthio)ethyl]methylamino)ethanol,
2-([3-(benzylthio)propyl]methylamino)-1-propanol,
2-([2-(benzylthio)ethyl]methylamino)-1-propanol,
2-([2-(benzylthio)butyl]methylamino)ethanol,
3-([3-(benzylthio)butyl]methylamino)-1-propanol,
3-([4-(benzylthio)butyl]methyl-amino)-2-methyl-1-propanol,
2-([2-(benzylthio)ethyl]methylamino)-1-octanol,
2-([2-(benzylthio)ethyl]methylamino)-1-dodecanol,
2-([2-(benzylthio)hexyl]butylamino)ethanol,
2-([2-(benzylthio)ethyl]isopropylamino)ethanol,
2-([2-(benzylthio)ethyl][2,3-dimethylbutyl]amino)-1-propanol,
2-([2-(benzylthio)ethyl][2-butyloctyl]amino)ethanol,
2-([2-(benzylthio)-2,4-diethyloctyl]methylamino)ethanol,
2-([2-(benzylthio)ethyl]methylamino)-2-ethyl-1-decanol,
2-([2-(benzylthio)ethyl]methylamino)-cyclohexanemethanol,
2-([2-(benzylthio)ethyl]methylamino)-1,4-butanediol,
2-([2-(benzylthio)ethyl]methylamino)-2-hydroxymethyl-1,3-propanediol,
2-([2-(1-phenethylthio)propyl]butylamino)ethanol
and the like.

The novel compounds provided by this invention may advantageously be prepared by condensation of an aralkyl haloalkyl sulfide with an N-alkylaminoalkanol having at least one free amine hydrogen substituent. The condensation releases hydrogen halide to produce the N-alkyl-N-(aralkylthioalkyl)-aminoalkanol.

Useful aralkyl haloalkyl sulfides include, for example, bromides, chlorides and iodides such as benzyl 2-chloroethyl sulfide, benzyl 3-chloropropyl sulfide, benzyl 3-bromopropyl sulfide, benzyl 3-iodobutyl sulfide, bnezyl 2-chlorobutyl sulfide, benzyl 2-chloropropyl sulfide, 1-phenethyl 3-chloropropyl sulfide, (amylphenyl)methyl 3-chloropropyl sulfide and so forth. Useful aminoalkanols include for example 2-(methylamino)ethanol, 2-(ethylamino)ethanol, 2-(propylamino)-ethanol, 2-(ethylamino)-1-propanol, 2-(butylamino)-1-butanol, 2-[(2,3-dimethylbutyl)ammino]ethanol, 3 - (methylamino) - 2,2-dimethyl-1-propanol and so forth.

Conditions for preparation of the compnds of the present invention by the condensation reaction may comprise merely contacting the halide with the amine. Their ratios may be about that of a 1:1 molar ratio, or an excess of either may be used. Acid is released by the condensation reaction, and desirably the halide and amine are contacted in the presence of a base. Useful bases are salts containing oxygen in the anion including hydroxides such as KOH, oxides such as lime, carbonates such as sodium carbonate, and so forth, or tertiary amines like triethylamine or pyridine. The amount of base used will generally be approximately the calculated quantity needed to neutralize acid released, but more, such as up to 5 times the theoretical equivalent, may be used if desired.

As to the other conditions of reaction, the presence of solvents or diluents is desirable. These preferably are polar solvents, able to dissolve the base, such as the dimethyl ether of diethylene glycol, alcohols such as ethanol, and so forth. Temperatures may range from above freezing to below the decomposition temperatures of reaction mixture components; a range of 50°–150° C. is generally suitable. Pressure may also vary over a wide range, such as from sub-atmospheric pressures of down to, say 50 millimeters Hg, up to superatmospheric pressures of 1000 pounds per square inch or above. Generally, atmospheric pressures are suitable. It is usually desirable, however, to maintain a nitrogen atmosphere over the surface of the reaction mixtures to prevent access of air.

On completion of the reaction, the product N-alkyl-N-(aralkylthioalkyl)aminoalkanol is readily isolated by usual procedures. Where the above-mentioned preferred 1:1 molar ratio of sulfide to aminoalkanol has been employed, the reaction mixture can advantageously be worked up, after removal of solvent, by extraction with water to remove unreacted aminoalkanol, followed by acidification and then extraction with an organic solvent such as ether, to remove unreacted sulfide. When the aqueous layer is now made alkaline, by addition of a base such as sodium hydroxide, the product amine separates as an oil which, it is found, is substantially pure product.

It may be desirable to isolate the amine as a salt such as the hydrochloride salt. Practically any protonic acid can be used to form the acid addition salts, and useful acids, including physiologically acceptable acids such as hydrochloric and maleic, for forming salts of amines are well known in the art.

The N-alkyl-N-(aralkylthioalkyl)aminoalkanols provided by this invention range from mobile liquids to crystalline solids. They are useful for a wide variety of industrial, pharmaceutical and agricultural applications. These benzylthio compounds are readily converted by debenzylation as set forth in copending application S.N. 176,409, filed concurrently herewith, by Robert G. Wineman, Morton H. Gollis, and John C. James, to the corresponding N-alkyl-N-(mercaptoalkyl)-aminoalkanols, which have demonstrated activity in protecting animals against the harmful effects of ionizing radiation. The aralkylthio compounds of the invention can also be desulfurized by treatment with Raney nickel to provide dialkylaminoalkanols which can be used as plasticizers for vinyl polymers such as polyvinyl chloride, and the esters of which are pharmaceuticals. The tertiary amines of the present invention, and especially the monohydric aminoalkanols hereof, are particularly advantageous intermediates for preparation of substituted aminoalkanols and derivatives thereof because of their freedom from configurations susceptible to cyclization and other undesired reactions. Thus, for example, the hydroxyalkyl substituent of the amine nitrogen atom can be preserved unchanged while the other functional positions of the compound are subjected to relatively strenuous conditions employed for example, to prepare therefrom the sulfonium quaternary such as the methiodide, sulfur oxidation derivatives such as the sulfinyl derivative, and so forth. The present compounds can also readily be quaternized on the nitrogen atom. Additionally, the compounds of the invention may be employed as rubber chemicals, for example as antioxidants or to produce crosslinking and vulcanization of rubbers and rubbery polymers; as agricultural toxicants, to produce repression and kill of undesirable organisms such as weeds, insects, fungi, bacteria, nematodes and the like; as physiological agents exerting pharmaceutical effects such as protection against the lethal and tissue damaging action of ionizing radiation; as surface-active and detergent agents; as chelating agents; as petroleum additives; and so forth.

The invention is illustrated but not limited by the following examples, in which all parts are by weight unless otherwise noted.

*Example 1*

This example illustrates preparation of 2-([(2-benzylthio)ethyl]n-butylamino)ethanol.

A mixture of 75 parts of benzyl 2-chloroethyl sulfide (0.4 mole) with 37 parts of 2-(n-butylamino)ethanol (0.4 mole) and 22 parts of anhydrous sodium carbonate (0.21 mole) in n-propyl alcohol is stirred and refluxed for 18 hours. The reaction mixture is then cooled to room temperature and filtered, and the solvent is removed by evaporation, to leave a viscous oil. The oil is extracted with water, and the extracted oil is acidified with 5 N hydrochloric acid. The acidified oil is extracted with ether, and the resulting acidic aqueous layer is separated, and made alkaline with 20% aqueous sodium hydroxide solution. The resulting oily layer is removed, and the remaining alkaline aqueous layer is extracted with ether, the ether extracts being combined with the oil. The oil and ether extracts, combined, are filtered, and the ether is removed to provide a yellow oil which after drying at 0.5 mm. and 55–60° C., is substantially pure 2-([(2-(benzylthio)ethyl]n-butylamino)ethanol:

Calc. for $C_{15}H_{25}NOS$: C, 67.4%; H, 9.4%; N, 5.2%. Found: C, 67.5%; H, 9.4%; N, 5.2%.

The $M_D$ of the product, calculated from the observed values, $n_D^{20}$ 1.5283, $d_4^{20}$ 1.031, is 81.16; calculated $M_D$ 81.32.

*Example 2*

This example describes the preparation of 2-([2-(benzylthio)ethyl]methylamino)ethanol.

A reaction mixture is prepared by combining 75 parts (0.4 mole) of benzyl 2-chloroethyl sulfide with 90 parts (1.2 moles) of 2-methylaminoethanol and 24 parts of sodium carbonate (0.22 mole) in absolute ethanol, and the reaction mixture is refluxed for 24 hours, after which it is cooled, filtered and the solvent removed by evaporation. The resulting reaction mixture is distilled and the fraction boiling between 24° and 68° C. column head temperature (Vigreaux column) at 0.04 millimeter (mm.) is recovered. This residue is acidified with concentrated hydrochloric acid and the acidic mixture is extracted with ether. The aqueous layer is concentrated to dryness, with intermittent addition of anhydrous isopropanol, to provide a viscous oil which is dried at 50° C./0.2 mm. The product is a viscous liquid which crystallizes very slowly. A sample of the crystalline product is triturated with anhydrous ether, and washed on a Buchner funnel with anhydrous ether, after which it is dried. The resulting sample of the hydrochloride salt of the amine melts at 51–53° C. Treatment of the hydrochloride with 30% aqueous sodium hydroxide produces separation of the oily amine, which is isolated by extraction with ether, and evaporation of the ether. The amine salt analyzes correctly:

Calc. for $C_{12}H_{20}ClNOS$: C, 55.1%; H, 7.7%; Cl, 13.5%; N, 5.4%; S, 12.3%. Found: C, 55.3%; H, 7.8%; Cl, 13.6%; N, 5.3%; S, 12.3%.

The molar refraction of the amine, calculated from the observed values, $n_D^{20}$ 1.5498, $d_4^{20}$ 1.072, is 66.93; the theoretical value for 2-([2-(benzylthio)ethyl]methylamino)ethanol is 67.46.

*Example 3*

This example illustrates the preparation of 2-([3-(benzylthio)propyl]methylamino)ethanol.

A reaction mixture is prepared by combining 100 parts of benzyl 3-chloropropyl sulfide (0.5 mole) with 37 parts of 2-methylaminoethanol and 28 parts (0.27 mole) of anhydrous sodium carbonate in absolute ethanol, and this reaction mixture is refluxed for 24 hours. It is then cooled, filtered and heated to remove solvent. The residue is shaken with water, and then treated with hydrochloric acid in water (concentrated hydrochloric acid). The resulting acidic mixture is extracted with ether, and the aqueous layer is then treated with 50% aqueous sodium hydroxide, to produce separation of an oily layer. This is separated and the aqueous portion is extracted with ether, to produce ether extracts which are combined with the previously separated oily layer. The combined oil and ether extracts are washed with a saturated salt solution, dried over anhydrous magnesium sulfate, filtered and the ether removed, to produce 2-([3-(benzylthio)propyl]methylamino)ethanol. The infrared spectrum of this product is consistent with the assigned structure, and the elemental analysis is correct for that calculated:

Calc. for $C_{13}H_{21}NOS$: C, 65.2%; H, 8.8%; N, 5.9%. Found: C, 64.4%; H, 8.5%; N, 4.9%.

The molar refraction calculated from the observed values $n_D^{20}$ 1.5527, $d_4^{20}$ 1.063 is 71.96, compared to the theoretical value of 72.08.

*Example 4*

The procedure in the preceding example is repeated, but at the close of the reaction, after filtration and removal of solvent, the product is isolated by distillation of the reaction mixture. The fraction boiling at 131–137° C./0.15 mm. is collected. The refractive index $n_D^{20}$ is 1.5506 and the density $d_4^{20}$ is 1.060. The molar refraction calculated from these values is 72.00, compared to the theoretical value of 72.08. The infrared spectrum is consistent with the assigned structure, as is the analysis:

Calc. for CHNOS: C, 65.2%; H, 8.8%; N, 5.9%; S, 13.4%. Found: C, 65.2%; H, 8.8%; N, 5.9%; S, 13.5%.

While the invention has been illustrated with reference to various particular preferred embodiments thereof, it will be appreciated that modification and variation can be made within the scope of the appended claims without departing from the invention.

What is claimed is:

1. N-alkyl-N-(aralkylthioalkyl)aminoalkanols of the formula

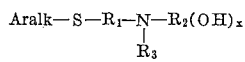

where each R is saturated aliphatic hydrocarbon. Aralk is an aralkyl hydrocarbon radical consisting of saturated aliphatic hydrocarbon substituted by a benzenoid ring, each said hydrocarbon radical containing up to 12 carbon atoms, $x$ is an integer of from 1 to 3, and each of the hydroxy groups is primary hydroxyl.

2. N-alkyl-N-(benzylthioalkyl)aminoalkanols of the formula

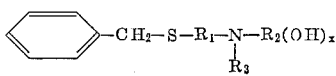

where each R is saturated aliphatic hydrocarbon of up to 12 carbon atoms, $x$ is an integer of from 1 to 3, and each of the hydroxy groups is primary hydroxyl.

3. The compounds of claim 2 containing a single primary hydroxyl group.

4. 2-([2-(benzylthio)ethyl]methylamino)ethanol.
5. 2-([3-(benzylthio)propyl]methylamino)ethanol.
6. 2-([2-(benzylthio)ethyl]n-butylamino)ethanol.

References Cited by the Examiner

UNITED STATES PATENTS

| | | | |
|---|---|---|---|
| 2,769,839 | 11/1956 | Fincke | 260—570.5 |
| 2,774,770 | 12/1956 | Kerwin et al. | 260—570.5 X |
| 3,079,403 | 2/1963 | Weinstock | 260—570.5 X |
| 3,081,336 | 3/1963 | Kaiser et al. | 260—570.5 X |
| 3,089,872 | 5/1963 | Krapcho | 260—239.3 |

OTHER REFERENCES

Rachinskii et al.: "Chemical Abstracts," vol. 54, p. 24368 (1960).

CHARLES B. PARKER, *Primary Examiner.*

LEON ZITVER, *Examiner.*

ROBERT V. HINES, *Assistant Examiner.*